United States Patent Office 3,262,885
Patented July 26, 1966

3,262,885
FISSION-PRODUCTS-CONTAINING COMPOSITION AND PROCESS OF MAKING
Peter R. Rushbrook, Richland, Wash., assignor to the United States of America as represented by the United States Atomic Energy Commission
No drawing. Filed Apr. 8, 1964, Ser. No. 358,385
4 Claims. (Cl. 252—301.1)

The invention described herein was made in the course of, or under, a contract with the United States Atomic Energy Commission.

This invention deals with the conversion of fission-products-containing zeolite granules into a solid integral mass.

Zeolites have melting points in the range of 1100–1400° C., too high to permit fusion in equipment of ordinary structural material. Fission products present in aqueous solutions are frequently absorbed on zeolites either for storage in a convenient form, or to make them better suitable as a source of useful radiation, or to dispose of the radioactive fission products by burial. For all purposes, the conversion of the fission-products-containing zeolites to as small a volume as possible is desirable.

It is also desirable that they be bound into an integral mass so that they will not be readily dispersed in case of an accident.

It has been suggested to cast a metal or an alloy around the zeolite granules to consolidate the latter. This method, however, has the drawbacks that metals usually do not wet the zeolites satisfactorily and thus do not bring about a firm bond therewith. Furthermore, zeolites, which are considerably lighter than most metals, usually tend to float on top of the molten metal, and application of pressure is necessary to hold the zeolite granules down in the metal.

It is an object of this invention to provide a process for the consolidation of fission-products-containing zeolites, whereby the zeolite is strongly absorbed or even dissolved and a solid integral unit is obtained.

The object of this invention is accomplished by mixing the fission-products-containing zeolite granules with a powdered mixture of lithium fluoride, boron oxide and silica and melting the mixture at a temperature of about 800° C. for about two hours and then cooling the mixture to room temperature. The melting conditions are not critical. Melting in air at atmospheric pressure is satisfactory.

The mixture may contain from 20 to 50% by weight of the fission-products-containing zeolite, from 40 to 10% by weight of lithium fluoride, from 40 to 10% by weight of silica and from 10 to 50% by weight of boron oxide. A compound that has proved especially well suitable contains about 35% by weight of dried fission-products-containing zeolite, about 5% by weight of lithium fluoride and about 60% by weight of boron oxide. This compound resisted especially well shattering by thermal shock.

In the following, a few examples are summarized of the compound of this invention.

| Zeolite [a] | LiF [a] | SiO$_2$ [a] | B$_2$O$_3$ [a] |
|---|---|---|---|
| 25.0 | 25.0 | 25.0 | 25.0 |
| 50.0 | 25.0 | 12.5 | 12.5 |
| 50.0 | 12.5 | 25.0 | 12.5 |
| 50.0 | 12.5 | 12.5 | 25.0 |
| 25.0 | 50.0 | 12.5 | 12.5 |
| 25.0 | 12.5 | 50.0 | 12.5 |
| 25.0 | 12.5 | 12.5 | 50.0 |
| 28.6 | 14.3 | 28.6 | 28.6 |
| 20.0 | 40.0 | 20.0 | 20.0 |
| 28.6 | 28.6 | 14.3 | 28.6 |
| 20.0 | 20.0 | 40.0 | 20.0 |
| 28.6 | 28.6 | 28.6 | 14.3 |
| 20.0 | 20.0 | 20.0 | 40.0 |
| 44.4 | 22.2 | 22.2 | 11.1 |
| 40.0 | 20.0 | 20.0 | 20.0 |
| 33.3 | 16.7 | 16.7 | 33.3 |
| 44.4 | 22.2 | 11.1 | 22.2 |
| 33.3 | 16.7 | 33.3 | 16.7 |
| 44.4 | 11.1 | 22.2 | 22.2 |
| 33.3 | 33.3 | 16.7 | 16.7 |

[a] Percent by weight.

In all cases summarized above, the zeolite was bound into a solid mass with the fused powder after melting for two hours as described above and cooling.

All these compositions are insoluble in cold water, so the fission products will not be dissolved on accidental contact with, say, river water or ground water. They can, however, be broken down by common reagents, e.g., ordinary mineral acids, when it is desirable to recover the fission products.

It will be understood that the invention is not to be limited to the details given herein but that it may be modified within the scope of the appended claims.

The embodiments of the invention in which an exclusive property or privilege is claimed are defined as follows:

1. A process of consolidating fission-products-containing granular zeolite, comprising mixing from 20 to 50% by weight of said zeolite with from 40 to 10% of lithium fluoride, from 40 to 10% of silica and from 10 to 50% of boron oxide, heating the mixture obtained at about 800° C. for two hours and then cooling the mass obtained to room temperature.

2. The process of claim 1 wherein 35 parts of zeolite are mixed with 5 parts of lithium fluoride and 60 parts of boron oxide.

3. As a new composition of matter, a melted and cooled mixture of from 20 to 50% by weight of zeolite with from 40 to 10% of lithium fluoride, from 40 to 10% of silica and from 10 to 50% of boron oxide.

4. The composition of claim 3 wherein 35 parts by weight of zeolite are mixed with 5 parts of lithium fluoride and 60 parts of boron oxide.

References Cited by the Examiner
UNITED STATES PATENTS
2,943,059 6/1960 Beck et al.
3,032,428 5/1962 Ginther.

BENJAMIN R. PADGETT, *Primary Examiner.*
L. A. SEBASTIAN, *Assistant Examiner.*